(12) United States Patent  (10) Patent No.: US 8,683,000 B1
Schlansker et al.  (45) Date of Patent: Mar. 25, 2014

(54) VIRTUAL NETWORK INTERFACE SYSTEM WITH MEMORY MANAGEMENT

(75) Inventors: Michael S. Schlansker, Los Altos, CA (US); Erwin Oertli, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1592 days.

(21) Appl. No.: 11/553,976

(22) Filed: Oct. 27, 2006

(51) Int. Cl.
*G06F 15/16* (2006.01)

(52) U.S. Cl.
USPC .............................. 709/212; 709/224; 709/232

(58) Field of Classification Search
USPC ......................................................... 709/212
See application file for complete search history.

(56) References Cited

U.S. PATENT DOCUMENTS

| | | | |
|---|---|---|---|
| 5,453,982 A * | 9/1995 | Pennington et al. ........... | 370/235 |
| 5,968,128 A * | 10/1999 | Lauck et al. .................. | 709/232 |
| 6,347,337 B1 | 2/2002 | Shah et al. | |
| 6,460,080 B1 | 10/2002 | Shah et al. | |
| 6,594,701 B1 * | 7/2003 | Forin ............................ | 709/232 |
| 6,754,775 B2 * | 6/2004 | Chaudhry et al. ............. | 711/128 |
| 6,760,307 B2 | 7/2004 | Dunning et al. | |
| 6,981,051 B2 | 12/2005 | Eydelman et al. | |
| 7,085,846 B2 * | 8/2006 | Jenne et al. .................... | 709/232 |
| 7,213,087 B1 * | 5/2007 | Bertone et ...................... | 710/56 |
| 7,441,055 B2 * | 10/2008 | Wagh et al. .................... | 710/29 |
| 7,712,006 B1 * | 5/2010 | Miller ............................ | 714/753 |
| 7,725,556 B1 * | 5/2010 | Schlansker et al. ........... | 709/212 |
| 2002/0055993 A1 * | 5/2002 | Shah et al. ..................... | 709/223 |
| 2002/0150049 A1 * | 10/2002 | Collier et al. .................. | 370/236 |
| 2004/0174814 A1 * | 9/2004 | Futral ............................ | 370/231 |
| 2005/0223139 A1 * | 10/2005 | Wagh et al. .................... | 710/52 |
| 2006/0098681 A1 | 5/2006 | Cafiero et al. | |
| 2006/0277126 A1 * | 12/2006 | Rosenbluth et al. ........... | 705/35 |
| 2007/0005870 A1 * | 1/2007 | Neiger et al. ................... | 711/6 |
| 2007/0067435 A1 * | 3/2007 | Landis et al. .................. | 709/224 |
| 2007/0094530 A1 * | 4/2007 | Kakizaki et al. ............... | 714/4 |
| 2007/0162559 A1 * | 7/2007 | Biswas et al. .................. | 709/216 |
| 2007/0266179 A1 * | 11/2007 | Chavan et al. ................. | 709/250 |
| 2007/0268926 A1 * | 11/2007 | Nakagawa et al. ............ | 370/428 |
| 2007/0276973 A1 * | 11/2007 | Tan et al. ....................... | 710/112 |
| 2008/0002736 A1 * | 1/2008 | Droux et al. ................... | 370/463 |
| 2008/0189510 A1 * | 8/2008 | Riddoch et al. ................ | 711/211 |
| 2009/0199177 A1 * | 8/2009 | Edwards et al. ............... | 718/1 |
| 2010/0312928 A1 * | 12/2010 | Brownell et al. .............. | 710/57 |

* cited by examiner

*Primary Examiner* — Hamza Algibhah (57) ABSTRACT

A virtual network interface system with memory management is provided, including a network interface controller having a memory with a memory credit and a flow-control for managing the network interface controller. A computer cluster is linked to the network interface controller for exchanging the memory credit with the network interface controller.

20 Claims, 6 Drawing Sheets

VIRTUAL NETWORK INTERFACE SYSTEM WITH MEMORY MANAGEMENT

CROSS-REFERENCE TO RELATED APPLICATION

The present application contains subject matter related to a concurrently filed application by Michael Schlansker, Erwin Oertli, and Norman Paul Jouppi entitled "Computer System with Concurrent Direct Memory Access". The related application is identified by Ser. No. 11/553,953 and is assigned to Hewlett-Packard Development Company, LP.

TECHNICAL FIELD

The present invention relates generally to network interface communication, and more particularly to a system for network interface communication with memory utilization management.

BACKGROUND ART

Network Interface Controllers or NIC's are communication devices that are used to send and receive messages from one node (computing system) to another node through a communication network. These NIC's reside in every computer system that accesses a network or the internet. NIC's may be found in laptop computers, wireless PDA's, Enterprise servers, or compute-intensive clustered processors, such as research computer clusters.

An existing flow control protocol, known as Stop and Wait "Automatic Repeat Request" (ARQ), transmits a data packet and then waits for an acknowledgment (ACK) from the termination node before transmitting the next packet. As data packets flow through the network from node to node, latency becomes a problem. Latency results from the large number of links in the fabric because each packet requires an acknowledgment of successful receipt from the receiving node before the next packet can be sent from the transmitting node. Consequently, there is an inherent delay resulting from the transit time for the acknowledgment to reach the transmitting node from the receiver.

One solution, which is known as "Go Back n ARQ", uses sequentially numbered packets, in which a sequence number is sent in the header of the frame containing the packet. In this case, several successive packets are sent up to the limit of the receive buffer, but without waiting for the return of the acknowledgment. According to this protocol, the receiving node only accepts the packets in the correct order and sends request numbers (RN) back to the transmitting node along with the flow control information, such as the state of the receive buffer. The effect of a given request number is to acknowledge all packets prior to the requested packet and to request transmission of the packet associated with the request number. The go back number n is a parameter that determines how many successive packets can be sent from the transmitter in the absence of a request for a new packet.

Specifically, the transmitting node is generally not allowed to send packet i+n before i has been acknowledged (i.e., before i+1 has been requested). Thus, if i is the most recently received request from the receiving node, there is a window of n packets that the transmitter is allowed to send before receiving the next acknowledgment. In this protocol, if there is an error, the entire window must be resent as the receiver will only permit reception of the packets in order. Thus, even if the error lies near the end of the window, the entire window must be retransmitted. This protocol is most suitable for large scaled networks having high probabilities of error. In this protocol, the window size n is based on the size of the receive buffer. Thus, the transmitter does not send more data than the receiver can buffer. Consequently, at start up, the two nodes must transmit information to each other regarding the size of their buffers and defaulting to the smaller of the two buffers during operation.

In an architecture that permits large data packets, unnecessarily retransmitting excess packets can become a significant efficiency concern. For example, retransmitting an entire window of data packets, each on the order of 4 Gigabytes, would be relatively inefficient.

Other known flow control protocols require retransmission of only the packet received in error. This requires the receiver to maintain a buffer of the correctly received packets and to reorder them upon successful receipt of the retransmitted packet. While keeping the bandwidth requirements to a minimum, this protocol significantly complicates the receiver design as compared to that required by "Go Back n ARQ". Many of the network architectures in use today are highly reliable and the risk of a dropped packet is minimal. In these environments, large groupings of computers known as computer clusters share large amounts of data across the network.

Computer clusters are multiple-node computer systems that may have more than 1000 nodes. All nodes in a computer cluster are networked so that any node can send to or receive from any other node. Techniques such as message passing allow messages to be sent from any node to any other node. A single NIC on a source node can send a message to any NIC on any destination node. Or a single destination NIC might receive a message from any source NIC. The arrival of received messages cannot be easily predicted and there is substantial risk that a NIC's receive buffer may be insufficient in size to contain all receive messages. In this case, messages may be lost.

Credit based flow control is used to prevent remote senders from sending messages to a receiver when there may be insufficient space to store received messages. Credits are associated with free storage. Initially, all storage is unused or free and the sum of all credits for a buffer should not exceed the total free storage space provided by the buffer. Available credits can be given to any sender and the pool of free credits can be diminished. When the sender sends a message that fits within its available credits, the sender can be guaranteed that there is sufficient space in the receiver.

Prior art credit management systems manage the flow of credits between a sender and a single receive buffer receives only from that sender. These credit management solutions use connection-based credit management. In this case, a distinct receive buffer is allocated for every potential sender. Credits are exchanged on a per-connection basis between a single sender and a single receiver. For computer clusters consisting of a very large number of nodes, this is a wasteful approach requiring more than, for example, a thousand dedicated receive buffers most of which are empty at any moment in time.

Thus, a need still remains for a virtual network interface system with memory management. In view of the increasing use of computer clusters to address massive compute problems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a virtual network interface system with memory management, including a network interface controller having a memory with a memory credit and a flow-control for managing the network interface controller. A computer cluster is linked to the network interface controller for exchanging the memory credit with the network interface controller.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of a memory chip, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. The term "on" means there is direct contact among elements.

Figure 1:
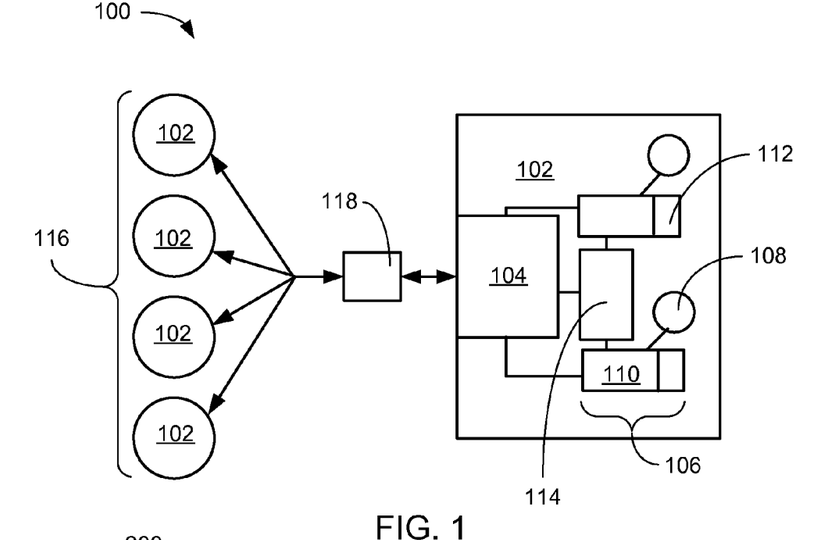
FIG. 1 is a block diagram of a virtual network interface system with memory management, in an embodiment of the present invention.

Referring now to FIG. 1, therein is shown a block diagram of a virtual network interface system 100 with memory management, in an embodiment of the present invention. The block diagram of the virtual network interface system 100 depicts a computer node 102 having a network interface controller (NIC) 104, such as an Ethernet controller, optical interface controller, or RF interface controller, supported by a composite virtual NIC 106 that is linked to an application 108. The composite virtual NIC 106 comprises a virtual network interface controller (VNIC) 110 and a flow-control 112, such as a flow-control network interface controller implemented in hardware, software, or a combination thereof. The NIC 104 and the VNIC 110 are coupled to a memory 114, such as a pinned memory, for storing and sending messages. The pinned memory is any memory that is constantly dedicated to support a function, such as a NIC. The pinned memory may not be off-loaded to disk storage or virtual memory. The NIC 104 is coupled to a network 118, which is further coupled to a plurality of other units of the computer node 102.

The NIC 104 is the physical interface controller. It sends and receives the electronic, optical, or RF signals between the network 118 and other units of the computer node 102. Each of the applications 108 that utilize the services of the NIC 104 is assigned the composite virtual NIC 106. The composite virtual NIC 106 comprises a block of the memory 114 and a driver program. The composite virtual NIC 106 is made up of the VNIC 110, which manages the movement of messages and data between the NIC 104 and the application 108, and the flow-control 112. The flow-control 112 manages the utilization of the memory 114 in the VNIC 110 on the destination side of the network 118. Collectively, all of the computer node 102 attached to the network 118 may be considered a computer cluster 116 or the computer cluster 116 contains the network 118.

The flow-control 112 functions in circuitry that performs as the memory manager for the transfer of data for the application 108 to which it is linked. When the computer node 102 is initialized, the flow-control 112 is assigned a unique identity for network communication. The unique identifier may consist of the MAC address of the NIC 104 and a port identifier associated with the VNIC 110. The memory 114 available to the VNIC 110 is equally divided into segments called memory credits. Usually a memory credit represents a sufficient amount of the memory to transfer a small packet of data. The small packet of data may be in the range 100 to 150 bytes in length. When the application 108 wishes to transfer a large amount of data, the flow-control 112 assembles a message that requests an additional block of memory credits sufficient to handle a portion or the entire data transfer.

For illustrative purposes, the flow-control 112 is described as a functional block, although it is understood that the flow-control 112 may be implemented in a number of different approaches available to one ordinarily skilled in the art, such as software, hardware, integrated circuit, or a combination thereof.

Figure 2:
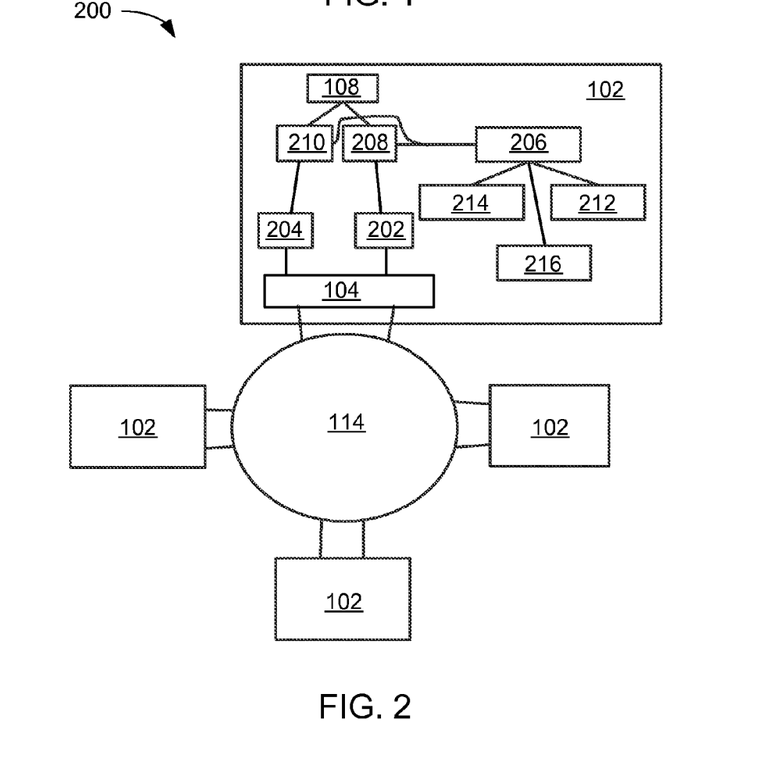
FIG. 2 is a block diagram of the virtual network interface system with memory management, in greater detail.

Referring now to FIG. 2, therein is shown a block diagram of the virtual network interface system 100 with memory management, in greater detail. The block diagram of the virtual network interface system 100 depicts the computer node 102, having the NIC 104 coupled to a receive virtual network interface controller (VNIC) 202 and a transmit virtual network interface controller (VNIC) 204. The receive VNIC 202 and the transmit VNIC 204 are linked to the application 108 by a flow-control manager 206, such as a flow-control management circuit, software, or a combination thereof. The flow-control manager 206 uses an FC receive module 208 and an FC transmit module 210 to manage the communication between the application 108 and the NIC 104. The flow-control manager 206 uses a local VNIC credit block 212, a remote VNIC credit block 214, and an unsatisfied credit request list 216, such as a logging circuit, software, or a combination thereof, to manage the memory 114 availability for data transfer.

The flow-control manager 206 is responsible for ensuring that no message command enters the transmit VNIC 204 ready state until sufficient space is available to hold that message within the receive VNIC 202 of the destination system, such as the computer node 102. The flow-control manager 206 also inserts memory credit requests into the transmit VNIC 204 command stream in order to gain permission to send large quantities of data. When sending a message, the flow-control manager 206 action typically might be to first insert a request-for-credit message to reserve receive-side space for a sizable component of that message and then to send multiple (Ethernet packet sized) message commands to move that message component. Each message assembled by the flow-control manager 206 may request additional memory credits, transfer a data message, grant a request for local memory credits, release remote memory credits, or perform combinations thereof.

When the flow-control manager 206 receives a request for local memory credits, it interrogates the local VNIC credit block 212 to determine if sufficient memory credits are available to satisfy the request. If there are sufficient memory credits available for the requested data transfer, the flow-control manager 206 generates a message granting the memory credits to the requesting unit, such as the computer node 102. The memory credits are logged as unavailable in the local VNIC credit block when they are granted. These memory credits may be granted as transient memory credits, which are released back to the flow-control manager 206 when the data is transferred to the application 108 that is the destination. The memory credits may be granted as persistent memory credits which remain in the control of the flow-control manager 206 of the requesting unit, such as the computer node 102.

If there are not sufficient memory credits available to satisfy the request, the flow-control manager 206 logs an unsatisfied credit request in the unsatisfied credit request list 216 and no further action is immediately taken. When additional memory credits become available, after being de-allocated by data transferred to the application 108, the flow-control manager 206 may apply those memory credits to the unsatisfied credit request that is pending. When a sufficient amount of memory credits is available, the flow-control manager 206 assembles a message to the original requestor, granting the memory credits.

This process minimizes the overhead of the network 118, because it does not require the requesting unit to re-transmit or poll for the additional memory credits. The management of transient memory credits also minimizes the overhead of the network 118. Memory credits may be automatically released when data is transferred to the application 108 and the memory 114 is de-allocated, without requiring any additional communication over the network 118.

Figure 3:
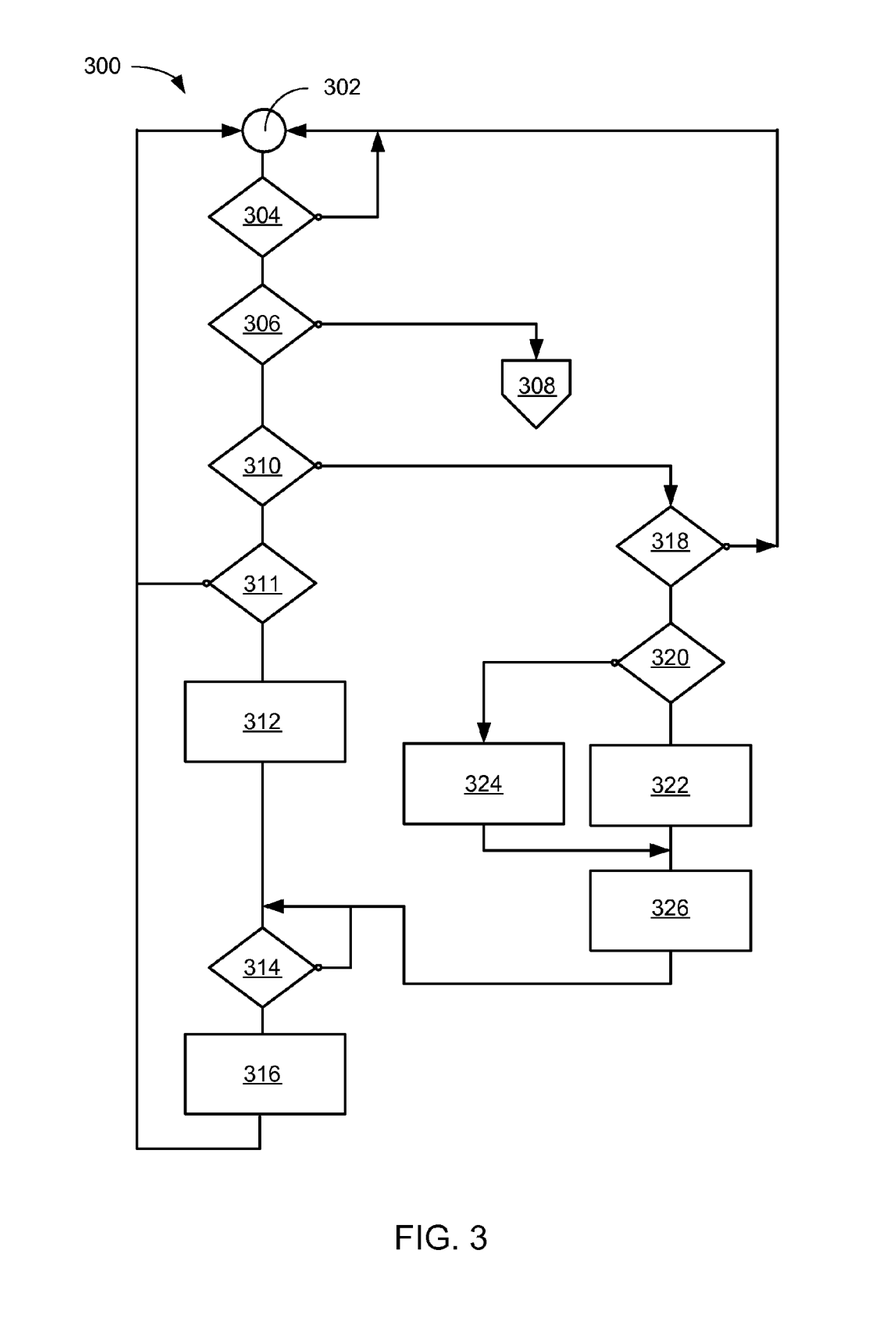
FIG. 3 is a flow chart of a flow-control NIC transmit process for memory management, in an embodiment of the present invention.

Referring now to FIG. 3, therein is shown a flow chart of a flow-control NIC transmit process 300 for memory management, in an embodiment of the present invention. The flow chart of the flow-control NIC transmit process 300 depicts an initialization point 302 which is coupled to a message pending decision block 304. If no current message is pending, the flow returns to the initialization point 302 to await a message. If a message is pending a transmit decision block 306 tests for a transmit message. If the transmit message is not pending, the flow moves to a link 308 for receive message processing. If the current message request is a transmit message, a one way decision block 310 tests for a single transaction message. If the transmit message is not a one way message, the flow moves to a sufficient local credits decision block 318 in the round trip message flow.

If the pending message is a one way transmit, the flow moves to a check remote credits block 311 to determine if there are sufficient remote transient memory credits for the transmission of the message. This operation is performed by reading the remote VNIC credit block 214, of FIG. 2. If insufficient memory credits were detected, a round trip message would have been issued to request additional memory credits for that destination. If there are not sufficient remote memory credits to send the message, the flow returns to the initialization point 302 to await another message.

If there are sufficient remote memory credits available for the message, the flow moves to a process message block 312. The process message block 312 decrements the remote memory credits for the destination device, appends the appropriate data to the message, and moves to a transmit buffer space decision block 314. The transmit buffer space decision block 314 waits for sufficient space in the transmission buffer to post the message. The flow does not progress until the transmission buffer can accept the message post. When the transmission buffer can accept the new message, the message is submitted to the transmit VNIC 204, of FIG. 2, for transmission of the message through the NIC 104, of FIG. 1, and the network 118, of FIG. 1, to the computer node 102, of FIG. 1, and the flow-control manager 206, of FIG. 2, at the destination. When the transmission of the message is complete, the flow proceeds to a restore credits block 316.

The restore credits block 316 performs the accounting of the local memory credits and remote memory credits that were used for the transfer. If the message was a data transmission using borrowed memory credits from the target unit of the computer node 102, of FIG. 1, then those memory credits are no longer available and the remote VNIC credit block 214 is updated to reflect the return of the borrowed memory credits. The local VNIC credit block 212 is updated to reflect that the message has been sent and the local memory credits, used for the outgoing message, are once again available. The flow then proceeds to the initialization point 302 to manage the next message.

The round trip message flow starts with the sufficient local memory credits decision block 318. If there are not sufficient local memory credits to receive a return message, the flow exits to the initialization point 302 to process the transmit request at a later time. If there are sufficient local memory credits to receive a response message, the flow proceeds to a check for remote credits decision block 320. If there are not sufficient remote memory credits to execute the transmission, the flow moves to a send credits request block 324. The send credits request block 324 assembles a minimal length message to request the appropriate amount of memory credits to execute the transmission of the data message. The flow would then proceed to the rest of the transmission flow. If the check for remote credits decision block 320 determines that there are sufficient remote memory credits for the destination device, the flow moves to a transmission accounting block 322.

In the transmission accounting block 322, the flow-control manager 206, of FIG. 2, updates the destination memory credits in the remote VNIC credit block 214, of FIG. 2, to reflect the memory credits used in the message transmission. The flow then moves to a prepare a transmission block 326, where the flow-control manager 206 updates the local VNIC credit block 212, of FIG. 2, to reflect the space reserved for the response message, and appends the destination and reply memory credits to the message for transmission. The flow then moves to the transmit buffer space decision block 314 to proceed with sending the message.

Figure 4:
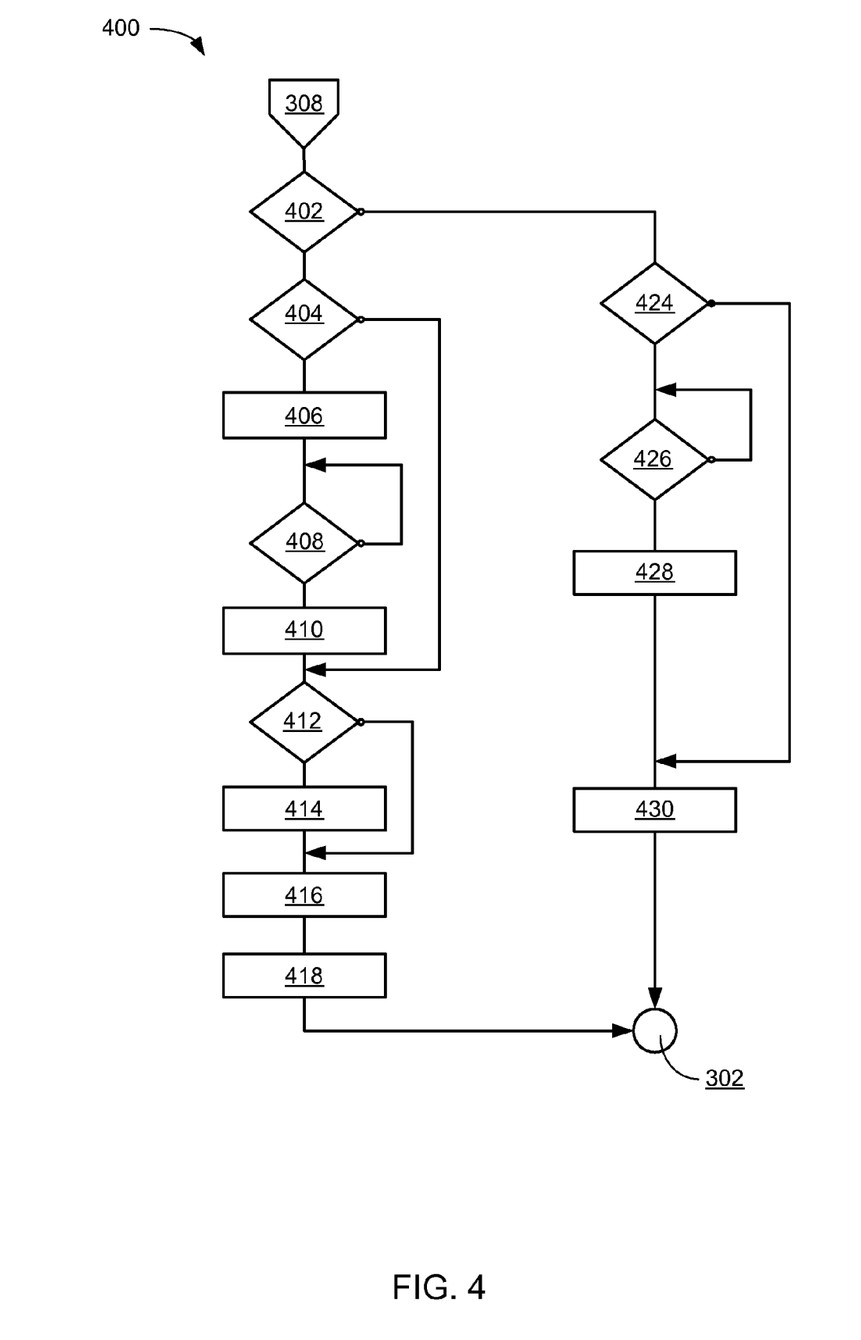
FIG. 4 is a flow chart of the flow-control NIC receive process for memory management, in a further embodiment of the present invention.

Referring now to FIG. 4, therein is shown a flow chart of a flow-control NIC receive process 400 for memory management, in a further embodiment of the present invention. The flow chart of the flow-control NIC receive process 400 depicts the link 308 at the beginning of the receive message flow. A check for round trip message block 402 tests the message type for proper manipulation of the data. If the message is a one way the flow moves to a check for data message block 424.

In the event that the receive message is a round trip message, such as a request for local memory credits to complete a data transfer, the flow moves to a check for data included block 404. If data is not included in the received message, the flow proceeds to a check for requested credits block 412. In the event that the received message does have data, the flow proceeds to a data to application block 406. In the data to application block 406, the flow-control manager 206, of FIG. 2, posts a request to the application 108, of FIG. 1, for transfer of the data out of the receive VNIC 202, of FIG. 2. If the application 108 is unable to immediately transfer the data and release the memory credits back to the remote sender, some of the local transient memory credits are used to reply to the remote sender. These local memory credits will be replaced when the application transfers the data from the receive VNIC 202.

The flow then proceeds to a check for data moved block 408 to monitor the movement of the data out of the receive VNIC 202. The flow remains in the check for data moved block until all of the data has been removed from the receive VNIC 202. At the completion of the data movement, the flow moves to a return borrowed credits block 410. In the return borrowed credits block 410, the flow-control manager 206 updates the content of the remote VNIC credit block 214, of FIG. 2, to return any borrowed memory credits to an available credit pool. The flow then moves to the check for requested credits block 412.

In the check for requested credits block 412, the flow-control manager 206 checks the message for a request of additional memory credits to proceed with the data transfer. If no request for additional memory credits is found, the flow jumps to a generate message block 416. This message might be an acknowledgement of the receipt of the transmitted data and closing the transaction. If the check for requested credits block 412 does find a request, the flow moves to a get additional credits block 414.

In the get additional credits block 414, the flow-control manager 206, of FIG. 2, checks the local VNIC credit block 212 for available memory credits that may be granted to the requesting unit. If there are memory credits available to satisfy the request, they may be reserved for the requesting unit and an appropriate message is generated to notify the requesting unit of the grant. In this type of request the memory credits granted for the transfer will be transient memory credits that are automatically returned when the data is transferred from the requesting unit to the application 108. No additional communication is required to return the transient memory credits. If there are no additional memory credits or insufficient memory credits to satisfy the request of the requesting unit, the flow-control manager 206 updates the unsatisfied credit request list 216, of FIG. 2, and sends a message that just acknowledges the receipt of the previous data message.

When additional memory credits become available that may satisfy the request for additional memory credits, the flow-control manager 206 will send an acknowledge message granting the memory credits for use by the appropriate requesting unit. The flow then moves to the generate message block 416 to assemble the correct response for return to the requesting unit. The flow then moves to an append requested credits block 418.

The append requested credits block 418 may append a grant of additional memory credits to the outgoing message if any are available. The primary function of the append requested credits block 418 is to set the appropriate indicators for a one way or round trip transmission pending. The append requested credits block 418 also performs the accounting of memory credits that may be released or for additional memory credits that may be required. The flow then moves to the initialization point 302 to enter the transmit message flow.

The check for data message block 424 is entered if a one way message is detected at the check for round trip message block 402. Examples of a one way message include return of borrowed memory credits, a send data message, a command abort, or an initialization message from a newly powered on the computer node 102, of FIG. 1. If a data message is not detected by the check for data message block 424, the flow moves to a restore credits block 430. When a data message is detected by the check for data message block 424, the flow proceeds to a make data available block 426. In the make data available block 426, the application 108, of FIG. 1 is interrupted to collect the data. The flow remains at the make data available block 426 until the data has been taken by the application. The flow then proceeds to an adjust credit distribution block 428.

In the adjust credit distribution block 428, any adjustments to the size or number of memory credits associated with current message are addressed. The flow then proceeds to the restore credits block 430. Any borrowed memory credits associated with this message would be returned to the available credit pool for further distribution. No response is generated as a result of this branch of the flow chart and all message pointers for the current received message are reset. The flow then returns to the initialization point 302 to operate on the next pending message.

In the Ethernet protocol, any data transmission recognized by the TCP program level requires an acknowledgement message from the receiving unit.

Figure 5:
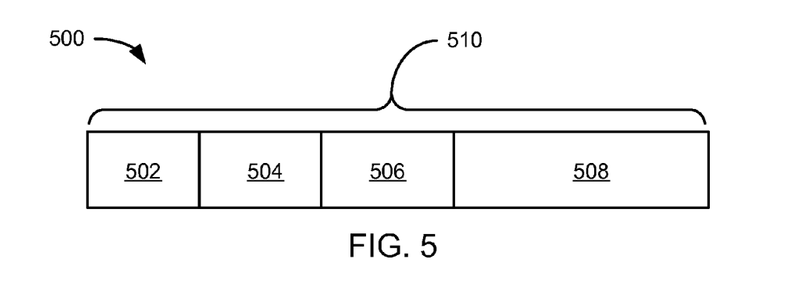
FIG. 5 is a block diagram of the flow-control NIC message format.

Referring now to FIG. 5, therein is shown a block diagram of a flow-control NIC message 500 format. The block diagram of the flow-control NIC message 500 format depicts a message type 502 followed by a FCNIC message length 504, an argument list 506 and an optional data message 508. Multiple copies of the flow-control NIC messages 500 may be nested within a single Ethernet packet. In some cases the data contained in the optional data message 508 may complete the data transfer. The entire message fits within a group of a memory credit 510 which is a segment of the memory 114 supporting the VNIC 110, of FIG. 1. The memory credit 510 is of a standard size across the computer cluster 116.

Figure 6:
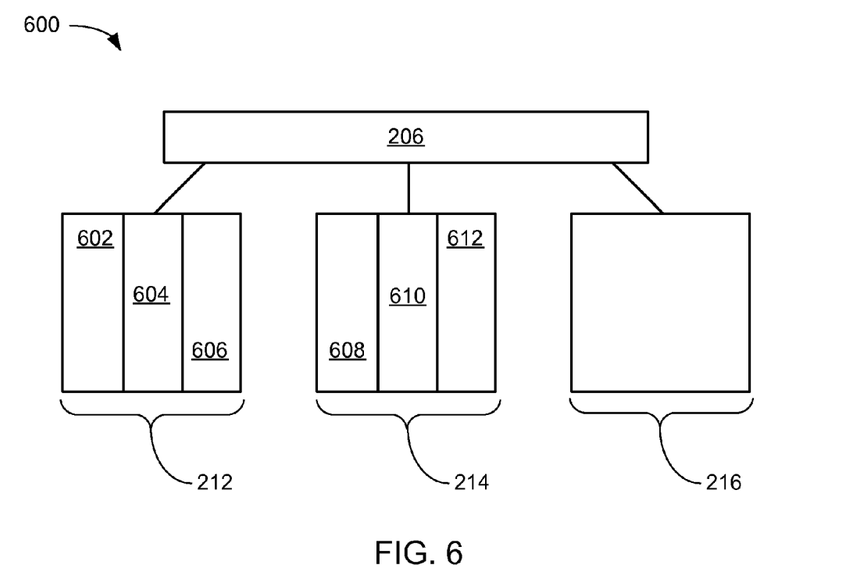
FIG. 6 is a block diagram of the flow-control NIC memory, in a memory management example.

Referring now to FIG. 6, therein is shown a block diagram of a flow-control NIC memory 600, in a memory management example. The block diagram of the flow-control NIC memory 600 depicts the local VNIC credit block 212, the remote VNIC credit block 214, and the unsatisfied credit request list 216 managed by the flow-control manager 206.

The local VNIC credit block 212, the remote VNIC credit block 214 and the unsatisfied credit request list 216 may represent segmented blocks of the memory 114 used by the flow-control manager 206. The local VNIC credit block 212 has a local credit pool 602, a persistent credit list 604 and a borrowed credit list 606. The local credit pool 602 keeps track of the amount of the uncommitted segments of the memory 114 in the receive VNIC 202, of FIG. 2, and the transmit VNIC 204, of FIG. 2. The persistent credit list 604 keeps the allocated memory credits list, where each of the memory credits is a standard size block of the memory 114 in the receive VNIC 202. The borrowed credit list 606 tracks the transient memory credits that are loaned to another of the computer node 102, of FIG. 1, for the purpose of data transfer. These borrowed memory credits may be returned when the data has been taken out of the receive VNIC 202 and the memory 114 has been de-allocated.

The description of the credit management system is for example only and is intended to clearly represent the function. The actual implementation may be a simplified hardware, software, or a combination thereof.

The remote VNIC credit block 214 is comprised of an allocated credit list 608, a remote persistent credit list 610 and a remote borrowed credit list 612. These lists represent the memory credits, such as a standard size block of the memory 114, available in other units of the computer node 102, of FIG. 1. This information is used by the flow-control manager 206 to determine the amount of data that can be sent, to a target unit of the computer node 102, in a single message. The unsatisfied credit request list 216 is a list of memory credits that have been requested, but that were not available at the time of the request. When memory credits become available in the local credit pool 602, they may be allocated to support one of the unsatisfied requests in the unsatisfied credit request list 216. When a sufficient amount of memory credits has been collected to satisfy a request, the flow-control manager 206 assembles a message to grant the memory credits to the requestor. When the request is satisfied and the message is sent, the line item, in the unsatisfied credit request list 216, is removed.

Figure 7:
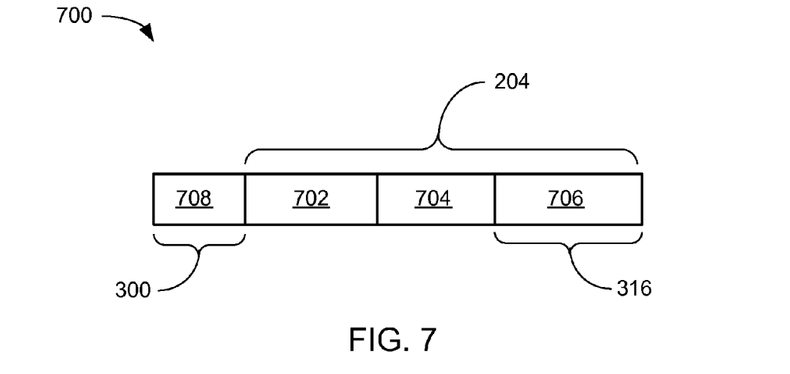
FIG. 7 is a block diagram of a transmit message queue managed by the flow-control, of FIG. 1.

Referring now to FIG. 7, therein is shown a block diagram of a transmit message queue 700 managed by the flow-control 112, of FIG. 1. The block diagram of the transmit message queue 700 depicts the transmit VNIC 204 having a VNIC transmit queue 702, a message pending block 704 and a message complete 706. An FCNIC input queue 708 is coupled to the VNIC transmit queue 702. The flow-control NIC transmit process 300 assembles the outgoing message for submission to the FCNIC input queue 708.

Messages progress from the FCNIC input queue to the VNIC transmit queue 702 for hand-off to the NIC 104, of FIG. 1, in the message pending block 704. The NIC 104 performs the actual transfer of the message into the network 118, of FIG. 1. When the transfer is done, the message complete 706 triggers the VNIC 110 to interrupt the application 108, of FIG. 1, for message complete notification. The restore credits block 316 performs the memory credit accounting associated with the message having been sent.

Figure 8:
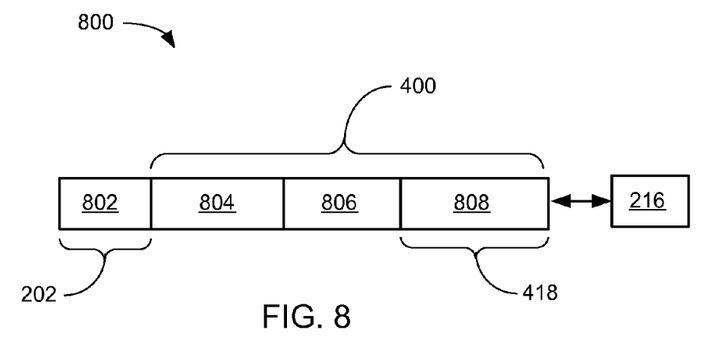
FIG. 8 is a block diagram of a receive message queue managed by the flow-control NIC, of FIG. 1.

Referring now to FIG. 8, therein is shown a block diagram of a receive message queue 800 managed by the flow-control 112, of FIG. 1. The block diagram of the receive message queue 800 depicts the receive VNIC 202 passing a message 802 to the flow-control NIC receive process 400. The message 802 is coupled to a front-side FCNIC process 804, a present to application process 806, and a back-side FCNIC process 808. The unsatisfied credit request list 216 is coupled to the back-side FCNIC process 808 and the append requested credits block 418.

The receive VNIC 202 receives the message 802 from the NIC 104, of FIG. 1. The message 802 resides in a block of the memory 114 that was pre-allocated when the message 802 was set-up. The message 802 is passed to the front-side FCNIC process 804 to have the flow-control NIC message 500 removed from the data. The present to application process 806 will present the data to the application 108, of FIG. 1. The back-side FCNIC process 808 performs the de-allocation of the memory 114 associated with the message 802 transfer. Any borrowed memory credits associated with the message 802 are released to the local credit pool 602, of FIG. 6. The accounting for memory credits that are released or borrowed is performed in the append requested credits block 418. Any requested memory credits that were unavailable may be satisfied by the memory credits that were released by processing the message 802. The unsatisfied credit request list 216 provides a list of the outstanding memory credit requests that might be serviced by any newly released memory credits.

Figure 9:
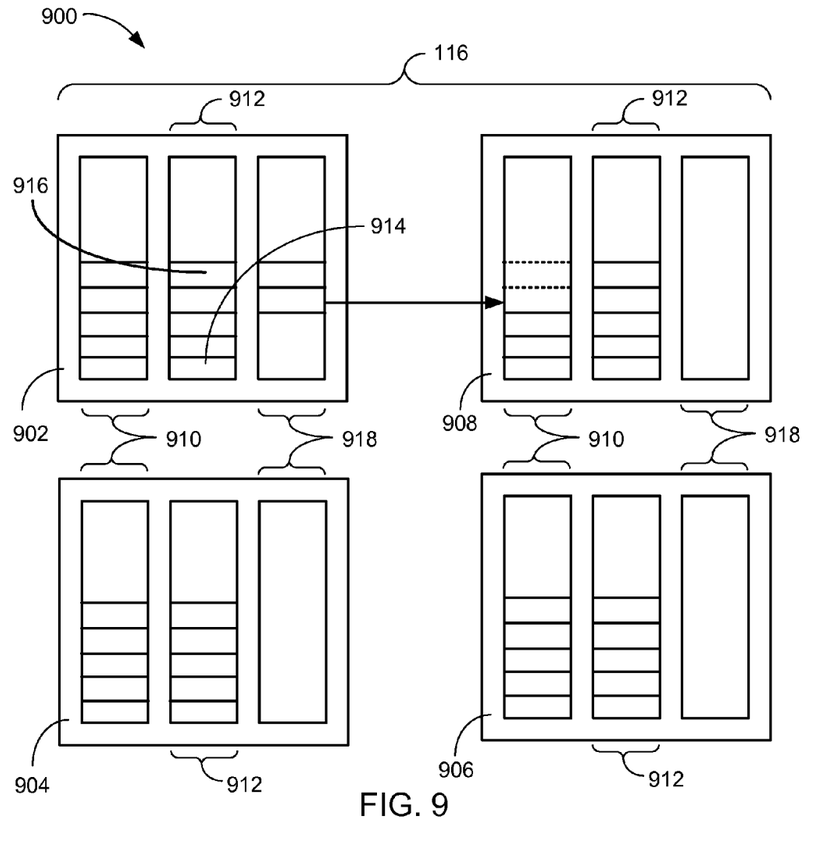
FIG. 9 is a block diagram of a four node network in an example of credit exchange by the flow-control NIC.

Referring now to FIG. 9, therein is shown a block diagram of a four node network 900 in an example of memory credit exchange by the flow-control 112. The block diagram depicts a first computer node 902 that is in the computer cluster 116 with a second computer node 904, a third computer node 906 and a fourth computer node 908. In this example, each of the computer nodes 902, 904, 906, and 908, has 10 memory credits. Each of the memory credits represents a standard unit of memory 114, of FIG. 1, that can be used for message exchange. The credit pool 910 represents the available memory credits maintained by the first computer node 902.

A block of a persistent memory credit 912 may be managed by the local node, such as the first computer node 902, or by a remote node. In this example the remote nodes include the second computer node 904, the third computer node 906, or the fourth computer node 908. In actual operation, any number of nodes is possible and a persistent memory credit 912 may be allocated for any or all of them. The allocation of the persistent memory credit 912 to all nodes in a cluster would be prohibitive due to the amount of committed memory involved. In stead, the persistent memory credit 912 is given only to closely coupled nodes, which require frequent communication between the nodes. The persistent memory credit 912, that is managed locally may be called a local pre-allocated memory credit 914, while the persistent memory credit 912 manager by one of the other computer nodes 904, 906, or 908, is called a remote pre-allocated memory credit 916.

Another group of memory credits, known as the transient memory credits 918 may be borrowed for the purpose of message transfer. In this example, the first computer node 902 has requested and received two of the transient memory credits 918 from the fourth computer node 908. These memory credits are in effect removed form the credit pool 910 and allocated for the use of the first computer node 902. As these memory credits are used for message transfer, the transient memory credits 918 are returned to the original owner, in this case the fourth computer node 908.

The persistent memory credits 912 are utilized to send and receive credit request messages and data. A single persistent memory credit 912 may be used to request additional transient memory credits 918 and start a data message transfer. In the case of the persistent memory credits 912, the control and use of the persistent memory credit 912 remains with the unit that owns the allocation. The first computer node 902 may borrow from the credit pool 910 in order to supply a group of the transient memory credits 918 to the third computer node 906. When the transfer from the third computer node 906 is complete, the transient memory credits 918 are returned to the credit pool 910 of the first computer node 902.

The third computer node 906 may respond to the same memory credit that the message was sent from, or it may have a remote pre-allocated memory credit 916 on the first computer node 902. In either case control of the local pre-allocated memory credit 914, or the remote pre-allocated memory credit 916 remains with the owner. For the example if the fourth computer node 908 requests three of the transient memory credits 918 from the third computer node 906 for a data transfer, the third computer node would use the remote pre-allocated memory credit 916 already assigned to the fourth computer node 908 and complement that with two of the transient memory credits 918 from the credit pool 910. The third computer node 906 may exchange data transfers with the first computer node 902 and the fourth computer node 908 concurrently. The messages will be may be added to the queue with a data packet from the fourth computer node 908 between two data packets from the first computer node 902. The delivery of the data is managed by the application 108, of FIG. 1. When the data has been transferred to the application 108, all of the transient memory credits 918 are returned for further allocation.

An example of the application of transient memory credits 918 as applied to the receive buffer space for a first computer node 902 is as follows. The receive buffer space of the first computer node 902 may be used at one time by a transmission from second computer node 904 and at another time by the transmission from the third computer node 906. Thus, this receive buffer space is shared, over time, between the second computer node 904 and the third computer node 906. A sequence of requests for transient memory credits 918 first by the second computer node 904 and then by the third computer node 906, as already described, achieves this sharing benefit among multiple remote senders.

Figure 10:
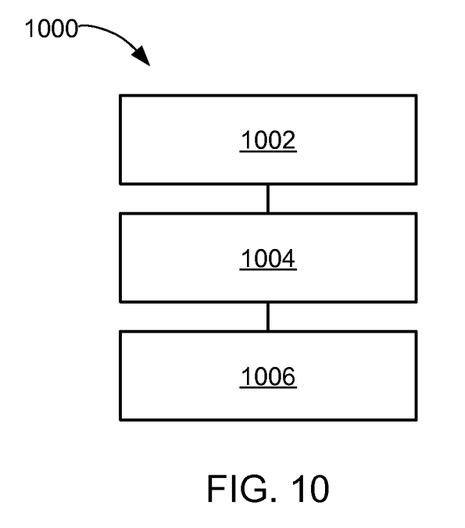
FIG. 10 is a flow chart of a method for operating a virtual network interface system for implementing a virtual network interface system with memory management, in an embodiment of the present invention.

Referring now to FIG. 10, therein is shown a flow chart of an embodiment of a method 1000 for operating a virtual network interface system with memory management, in an embodiment of the present invention. The method 1000 includes transferring 1002 data between a network interface controller 104, having a flow-control 112 and a memory 114, and a computer cluster 116 in a block 1002; managing 1004 the network interface controller 104 with the flow control 112 in a block 1004; and exchanging 1006 a memory credit 510 of the flow-control 112 between the network interface controller 104 and the computer cluster 116 in a block 1006.

In one aspect, the virtual network interface system with memory management improves memory credit management to combine aspects of time efficiency and space efficiency. The space in the receive queue is much better utilized when many senders can share a common receive queue and when that receive queue is managed by a flow-control. Network overhead is reduced while using a flow control management system.

The virtual network interface system extends memory credit management allowing many senders to efficiently share a single receive queue. The virtual network interface system also combines multiple memory credit types to more efficiently manage space within a shared receive queue, minimizing the size of the memory needed.

In another aspect, network overhead is minimized by automatically de-allocating borrowed memory credits when data is transferred from the memory holding the credit.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating a virtual network interface system with memory management comprising:
   requesting a memory credit by a network interface controller having a flow-control and a memory;
   managing the network interface controller with the flow-control;
   exchanging the memory credit by the flow-control between the network interface controller and a computer cluster; and
   transferring data between the network interface controller and the computer cluster with the memory credit.

2. The method as claimed in claim 1 further comprising:
   tabulating an unsatisfied memory credit request list by the flow-control; and
   managing pending requests from the computer cluster by the flow-control.

3. The method as claimed in claim 1 wherein exchanging a memory credit includes:
   borrowing the memory credit through a network between the network interface controller and the computer cluster;
   sending the data through the network; and
   releasing the memory credit when the data has been sent through the network.

4. The method as claimed in claim 1 further comprising:
   requesting a remote memory credit from the computer cluster for sending a message;
   assembling the message in a local memory credit by the flow-control;
   transmitting the message between the computer cluster and the network interface controller; and
   releasing the remote memory credit and the local memory credit when the message has been sent.

5. The method as claimed in claim 1 further comprising:
   managing a local memory credit by a local virtual network interface controller credit block in the network interface controller;
   managing a remote memory credit by a remote virtual network interface controller credit block in the computer cluster;
   accounting the local memory credit in the local virtual network interface controller credit block; and
   accounting the remote memory credit in the remote virtual network interface controller credit block by a flow-control manager of the flow-control.

6. A method for operating a virtual network interface system with memory management comprising:
   requesting a memory credit by a network interface controller having a flow-control and a memory with memory credits;

managing the network interface controller with the flow-control by allocating the memory credit for the data;
exchanging the memory credit by the flow-control between the network interface controller and a computer cluster;
managing the transferring of the data between the network interface controller and the computer cluster with the memory credit; and
transferring data between the network interface controller and the computer cluster including sending the data to an application.

7. The method as claimed in claim 6 further comprising:
tabulating an unsatisfied credit request list by the flow-control;
managing pending requests from the computer cluster by the flow-control; and
granting the memory credits requested by the computer cluster as borrowed memory credits are de-allocated.

8. The method as claimed in claim 6 wherein exchanging the memory credit includes:
borrowing the memory credit through a network between the network interface controller and the computer cluster for delivering a message;
sending the message through the network to the computer cluster;
receiving the message with the memory credit in the computer cluster; and
releasing the memory credit when the message has been sent through the network without sending an additional message.

9. The method as claimed in claim 6 further comprising:
requesting a remote memory credit by the network interface controller from a computer node in the computer cluster for sending a message;
allocating the remote memory credit in a receive virtual network interface controller by the computer node;
assembling the message in a local memory credit in the network interface controller by allocating the remote memory credit from a local credit pool in the network interface controller;
releasing the remote memory credit and the local memory credit when the message has been sent by returning the local memory credit to the local credit pool; and
de-allocating the remote memory credit by the receive virtual network interface controller.

10. The method as claimed in claim 6 further comprising:
managing a local memory credit by a local virtual network interface controller credit block having a local credit pool and a persistent credit list;
managing a remote memory credit by a remote virtual network interface controller credit block having a borrowed credit list;
accounting the local memory credit in the local virtual network interface controller credit block by monitoring an unsatisfied credit request list; and
accounting the remote memory credit in the remote virtual network interface controller credit block by monitoring the unsatisfied credit request list.

11. A virtual network interface system with memory management comprising:
a network interface controller having a memory with a memory credit and a flow-control for managing the network interface controller; and
a computer cluster linked to the network interface controller for exchanging the memory credit with the network interface controller.

12. The system as claimed in claim 11 further comprising:
a receive virtual network interface controller; and
a circuit for logging an unsatisfied credit request list and for managing pending requests to access the receive virtual network interface controller.

13. The system as claimed in claim 11 further comprising:
a flow-control manager in the network interface controller;
a pinned memory in the network interface controller for receiving a message from the computer cluster; and
a circuit for managing a reduced size required from the pinned memory by the flow-control manager.

14. The system as claimed in claim 11 further comprising:
a memory credit from a computer node;
a message transferred to the memory with the memory credit de-allocated when the message is transferred.

15. The system as claimed in claim 11 further comprising:
a local virtual network interface controller credit block of the network interface controller for managing a local memory credit of the memory;
a remote memory in the computer cluster;
a remote virtual network interface controller credit block for managing the remote memory;
a flow-control manager in the network interface controller; and
a circuit for accounting the local memory credit in the local virtual network interface controller credit block and the remote memory credit in the remote virtual network interface controller credit block.

16. The system as claimed in claim 11 wherein:
the network interface controller is in a computer node in the computer cluster;
the computer cluster has computer nodes; and
the memory has a segmentation in a standard unit of the memory credit for sharing by the computer nodes in the computer cluster and the flow-control in the network interface controller.

17. The system as claimed in claim 16 further comprising:
a receive virtual network interface controller; and
a circuit for logging an unsatisfied credit request list, for managing pending requests to access the receive virtual network interface controller, and for de-allocating memory credits.

18. The system as claimed in claim 16 further comprising:
a pinned memory in the network interface controller for receiving a message from the computer nodes;
a flow-control manager in the network interface controller; and
a circuit with the flow-control manager for accessing the pinned memory by the computer nodes.

19. The system as claimed in claim 16 further comprising:
a memory credit from a computer node for receiving a message includes the credit granted to the computer node; and
a flow-control manager for de-allocating the memory credit when the message is moved out of the memory credit.

20. The system as claimed in claim 16 further comprising:
a local virtual network interface controller credit block manages the local memory includes having a credit pool and a persistent memory credit;
a remote memory in the computer cluster;
a remote virtual network interface controller credit block manages the remote memory by having a borrowed memory credit;
a flow control manager in the network interface controller;

a circuit for accounting the local memory credit in the local virtual network interface controller credit block and the remote virtual network interface controller credit block; and the local memory credit for reuse by the computer node in the computer cluster.

\* \* \* \* \*